United States Patent
Chavez et al.

(10) Patent No.: US 7,636,383 B1
(45) Date of Patent: Dec. 22, 2009

(54) SIGNAL ACQUISITION WITH EFFICIENT DOPPLER SEARCH

(75) Inventors: Carlos J. Chavez, Marion, IA (US); Gunther B. Frank, Robins, IA (US); Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 583 days.

(21) Appl. No.: 11/416,619

(22) Filed: May 3, 2006

(51) Int. Cl.
*H04B 1/00* (2006.01)

(52) U.S. Cl. ............ 375/150; 375/130; 375/136; 375/147; 375/327; 375/341; 370/320; 370/335

(58) Field of Classification Search ......... 375/132–136, 375/147, 150, 152, 243, 130, 140, 145, 146, 375/153, 306, 316, 327, 341; 370/320, 335, 370/342, 479
See application file for complete search history.

(56) References Cited

U.S. PATENT DOCUMENTS

| | | | | |
|---|---|---|---|---|
| 6,118,808 A | * | 9/2000 | Tiemann et al. | 375/142 |
| 7,471,717 B2 | * | 12/2008 | Huang | 375/150 |
| 7,558,312 B2 | * | 7/2009 | Cheng et al. | 375/142 |
| 2004/0196896 A1 | * | 10/2004 | Yui | 375/232 |
| 2007/0120735 A1 | * | 5/2007 | Bromley et al. | 342/357.06 |
| 2007/0183486 A1 | * | 8/2007 | Cheng et al. | 375/150 |
| 2007/0183487 A1 | * | 8/2007 | Genghi | 375/150 |
| 2007/0195867 A1 | * | 8/2007 | Betz et al. | 375/152 |
| 2007/0211793 A1 | * | 9/2007 | Han | 375/150 |

OTHER PUBLICATIONS

Wavelets and Wideband Correlation Processing; Lora G. Weiss; IEEE Signal Processing Magazine; Jan. 1994; p. 13-32.

* cited by examiner

*Primary Examiner*—Shuwang Liu
*Assistant Examiner*—Hirdepal Singh
(74) *Attorney, Agent, or Firm*—Daniel M. Barbieri

(57) ABSTRACT

A receiver for computationally efficient signal acquisition of spread-spectrum chips affected by Doppler shift in an advanced tactical data link. Received signals with a very low signal-to-noise ratio are parsed in a multi-stage signal acquisition circuit architecture, and compared to a known sequence to determine correlation over a subset of the known sequence. Chip-rate-coherent correlation is performed over an interval of time for which the effect of Doppler shift on the chip rate are negligible. A non-coherent block then integrates intermediate metrics to obtain final metrics for the entire known sequence. The parsing of the correlation into subsets and stages allows for a more computationally efficient solution to the Doppler shift chip rate error problem by reducing the number of intermediate metrics that must be computed at high speed.

12 Claims, 2 Drawing Sheets

SIGNAL ACQUISITION WITH EFFICIENT DOPPLER SEARCH

CROSS-REFERENCE TO RELATED APPLICATIONS

This application is filed concurrently with commonly assigned, non-provisional U.S. patent application Ser. No. 11/416,620, entitled "Carrier Frequency Estimation via Symbol Rate Estimation", listing as inventors Carlos J. Chavez, Robert J. Frank; and U.S. patent application Ser. No. 11/416,621, entitled "Architecture for Signal Acquisition with Cyclic Range Search", listing as inventors Carlos J. Chavez, Gunter B. Frank, and Robert J. Frank.

BACKGROUND OF THE INVENTION

1. Field of Invention

The present invention relates generally to the field of command, control, communications, computer, intelligence surveillance, and reconnaissance (C4ISR) hardware and software systems and components, and in particular using spread-spectrum communications.

2. Description of Related Art

TTNT (Tactical Targeting Networking Technology) is an advanced tactical data link currently under development by Rockwell Collins Government Systems and the Advanced Technology Center. Modes supporting Low Probability of Detection (LPD) are a highly desirable addition to existing TTNT functionality. The primary challenge for an LPD receiver is to operate at extremely low signal-to-noise ratio (SNR), often well below negative 20 dB.

Critical to LPD operation is the capability of a receiver to acquire a signal in the presence of chip rate error caused by Doppler shift. This requires acquisition processing that searches over a range of Doppler shifts as well as over a range of arrival times. The present invention presents an apparatus and method for performing a computationally efficient Doppler search for signal acquisition. The reduction in high speed computation enabled by this technique approaches the number of Doppler shifts in the search, which can easily exceed a factor of ten.

The majority of chip rate error observed by an LPD receiver in a tactical environment is a result of Doppler frequency shift. The error Re in chip rate caused by Doppler shift is a function of relative velocity v, nominal (transmitted) chip rate Rc, and the speed of light c: $Re = \pm vRc/c$ Because an LPD system must operate at extremely low SNR, the known sequence of chips used for signal acquisition must be very long (on the order of 1 million chips) in order to produce reasonable probabilities of detection and false alarm.

In the present invention, certain terms are used as appreciated by a skilled artisan. Thus "chip" is often defined as "channel bit". A spread spectrum system, such as used by the present invention, achieves its spectral spreading using one or more techniques such as direct sequence, forward error correction, and orthogonal channel coding. Regardless of the technique used, the bits produced by the spreading are often referred to as "chips". These chips are modulated and sent over a channel. This distinguishes the bits created by the spreading technique ("chips") from the information bits going into the spreading technique ("bits"). Note that spread spectrum chips are not required to be binary. "Chip rate" is the rate or frequency at which the chips are transmitted. In a spread spectrum system, the chip rate is much faster than the information bit rate, thus the spectral spreading. "Chip time" is the reciprocal of the chip rate, or the duration in time of a single chip. "Multiple chip times" refers to a period of time that is equal to more than one chip time. A "known sequence" is a sequence of chips (or bits, or symbols) of which an authorized receiver has prior knowledge. The known sequence is typically sent at the beginning of a transmission. The receiver performs a search for the known sequence in order to detect the presence of a desired signal and synchronize its signal processing to it. The process of detecting the presence of a desired signal is often referred to as the signal "acquisition". After a signal is acquired it can be demodulated to extract information.

In the present invention, due to Doppler shift, the chip rate error caused by Doppler shift can result in multiple chip times of time error over the length of the known sequence. Thus, the LPD receiver must perform signal acquisition that searches over a range of Doppler shifts as well as over a range of arrival times. Furthermore, the signal acquisition function must provide an estimate of the chip rate Doppler shift so that it can be compensated for when demodulating the LPD signal. A conventional solution to this problem is to perform signal acquisition using a correlator for each of a number of possible Doppler shifts. However, the computational resources required for this approach are often prohibitive. What is lacking in the prior art is a computationally efficient technique for solving this problem.

SUMMARY OF THE INVENTION

Accordingly, an aspect of the present invention is to provide an computationally efficient architecture and technique for solving chip rate error due to Doppler frequency shift, used to acquire a signal at the receiver side of a spread spectrum TTNT tactical data link.

To this end, the correlation of a received spread spectrum known sequence is done in a parsed manner using subsets of the known sequence. The subsets are chosen to be short enough in the time domain so that the maximum possible Doppler shift will produce only a small amount of time error over each subset. Therefore, the "chip-rate-coherent" correlation is performed over an interval of time for which the effect of Doppler shift on the chip rate is negligible. A chip-rate-coherent correlation is one where any shift in timing caused by Doppler over the length of the correlation is small enough that it can be neglected. This amounts to assuming that there is no Doppler shift of the chip rate during the length of the correlation.

In addition, the parsing of the known sequence allows for a modular approach to solving for Doppler shift that necessitates fewer metrics be computed at high speed. As a consequence, with fewer computational resources required, a more computationally efficient solution to the Doppler shift problem results. The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
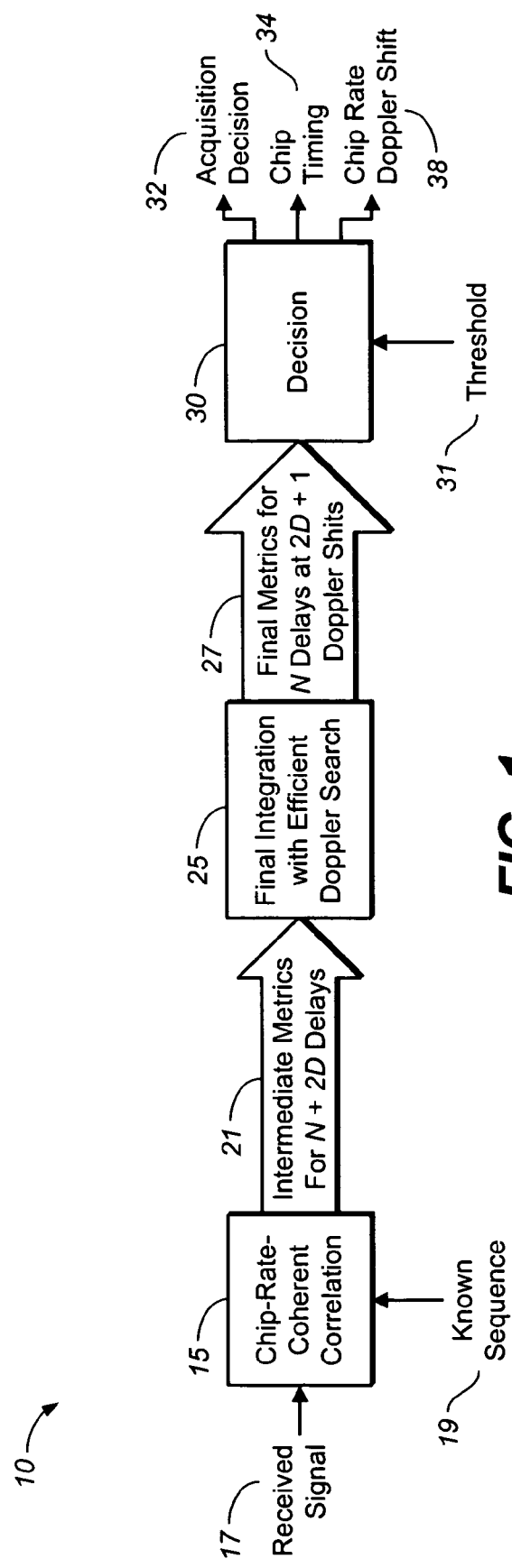
FIG. 1 is a block diagram for the signal acquisition with an efficient Doppler search of the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention may be hardware—such as a spread-spectrum receiver—that is hardwire programmed to perform the signal acquisition functions outlined herein (e.g., an ASIC), hardware running firmware, or hardware running software, with the software existing in memory, and which may be written in any computer language (such as C, C++, Perl, Java or the like), and further, and/or in the alternative, the software may be run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software, the source code, object code and/or executables of the software may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Turning attention to FIG. 1, there is shown a block diagram schematic of the system 10 for the method and apparatus of the present invention, which performs the technique of Signal Acquisition with Efficient Doppler Search. The signal acquisition system 10 must detect a desired signal with reasonable probabilities of detection and false alarm. In addition, the signal acquisition system must resolve the uncertainty in arrival time of the signal and the uncertainty in Doppler shift experienced by the signal. This enables subsequent demodulation and recovery of the information contained within the signal.

The uncertainty in arrival time can be bounded if the start time of any transmission is limited to some set of known allowable start times. Fortunately, this is typical of many LPD systems, and greatly simplifies the signal acquisition problem. Thus, the possible range of arrival time for a given allowable start time is determined by the possible range of propagation time (i.e. limited by the speed of light) and the possible range of time error between transmitter and receiver. In general, there is no direct way to determine the time error between the transmitter and receiver. That is why it must be included in the uncertainty in arrival time. The possible range of Doppler shift is determined by the possible range of relative velocity between the transmitter and receiver and the nominal chip rate. Signal Acquisition with Efficient Doppler Search functions with the assumption of knowledge of the possible range of arrival time and the possible range of Doppler shift.

The Chip-Rate-Coherent Correlation block 15 shown in FIG. 1 accepts the received spread-spectrum signal and the known sequence matching some desired signal, as inputs 17, 19, respectively. The Chip-Rate-Coherent Correlation block 15 correlates the incoming received signal 17 with the known sequence 19 for N+2D values of delay, producing an intermediate metric data for each delay, shown as arrow 21. In the figure, N corresponds to the number of delays needed to search the possible range of arrival time of the received signal 17; with D additional delays before and after the N delays are also included in this search. D corresponds to the maximum number of delays of time error (positive or negative) that can occur over the entire known sequence as a result of Doppler shift. The Chip-Rate-Coherent Correlation block 15 performs the correlation over subsets of the known sequence, thereby parsing the known sequence. The subsets are chosen to be short enough in time such that the maximum possible Doppler shift will produce only a small amount of time error over each subset (e.g. one chip time). Therefore, the chip-rate-coherent correlation is performed over an interval of time for which the effects of Doppler on the chip rate are negligible. A chip-rate-coherent correlation is one where any shift in timing caused by Doppler over the length of the correlation is small enough that it can be neglected. This amounts to assuming that there is no Doppler shift of the chip rate during the length of the correlation.

The block 25 in FIG. 1, Final Integration with Efficient Doppler Search block 25, accepts intermediate metrics for N+2D values of delay. This block non-coherently integrates consecutive intermediate metrics to obtain final metrics data for the entire known sequence. In this context, "non-coherence", "non-coherent" or "non-coherently" refers to that fact that Doppler shift may cause the chip timing to change from intermediate metric to intermediate metric. As a result, the chip timing from metric to metric cannot be assumed to be the same. A final metric is produced for each combination of N delays and 2D+1 Doppler shifts, for a total of N(2D+1) final metrics, as output at arrow 27. Block 25 is described in further detail infra, in connection with FIG. 2.

The Decision block 30 shown in FIG. 1 accepts the final metrics 27 and compares each to a threshold, which may be received as threshold signal 31. The threshold is typically determined in a compromise between false alarm probability and probability of successful detection of a desired signal. If one or more metrics exceed the threshold, this block determines that acquisition of a desired signal has occurred, and the decision whether or not signal acquisition has occurred is output as Acquisition Decision signal 32. Choosing the largest metric that exceeds the threshold produces an estimate of the arrival time of the detected signal and an estimate of the Doppler shift experienced by the detected signal, and are output by Decision block 25 as Chip Timing signal 34 and Chip Rate Doppler Shift Signal 36. These quantities may be used to determine chip timing and chip rate Doppler shift for use in subsequent demodulation of the detected signal.

In the present invention, the processing speed of the Chip-Rate-Coherent Correlation block 15 is much faster than that of the Final Integration with Efficient Doppler Search block 25. Further, while N(2D+1) final metrics are produced at relatively low speed in the Final Integration with Efficient Doppler Search block 25, only N+2D intermediate metrics must be computed at high speed in the Chip-Rate-Coherent Correlation block 15. By comparison, a conventional solution in the art would compute all N(2D+1) metrics at high speed. For large N, the Efficient Doppler Search technique can reduce high speed computation by a factor approaching 2D+1, which is the number of Doppler shifts in the search.

As an example of the increased computational efficiency of the present invention, consider the case where metrics for 17 Doppler shifts (D=8) must be computed for several thousand delays (N>1000). The reduction in high speed computation using the teachings of the present invention may approach a factor of 17.

Thus, as can be appreciated by one of ordinary skill from the teachings herein, the present invention performs signal acquisition in an architecture comprising a series of stages with the output of one stage feeding into the input of the neighboring stage, to form a multi-stage architecture, with the Chip-Rate-Coherent Correlation block 15, Final Integration with Efficient Doppler Search block 25, and Decision block 30 each working on spread-spectrum chips that are parsed into component subsets over which correlation and integration is performed to produce intermediate and final metrics. The stages involve a first chip-rate-coherent correlation stage (i.e. in Chip-Rate-Coherent Correlation block 15), a second "non-coherent" integration stage (i.e. in Final Integration with Efficient Doppler Search block 25), and a third final stage, the Decision block 30, which outputs signals relating to an acquisition decision 32, chip timing 34, and chip rate Doppler shift 36.

Figure 2:
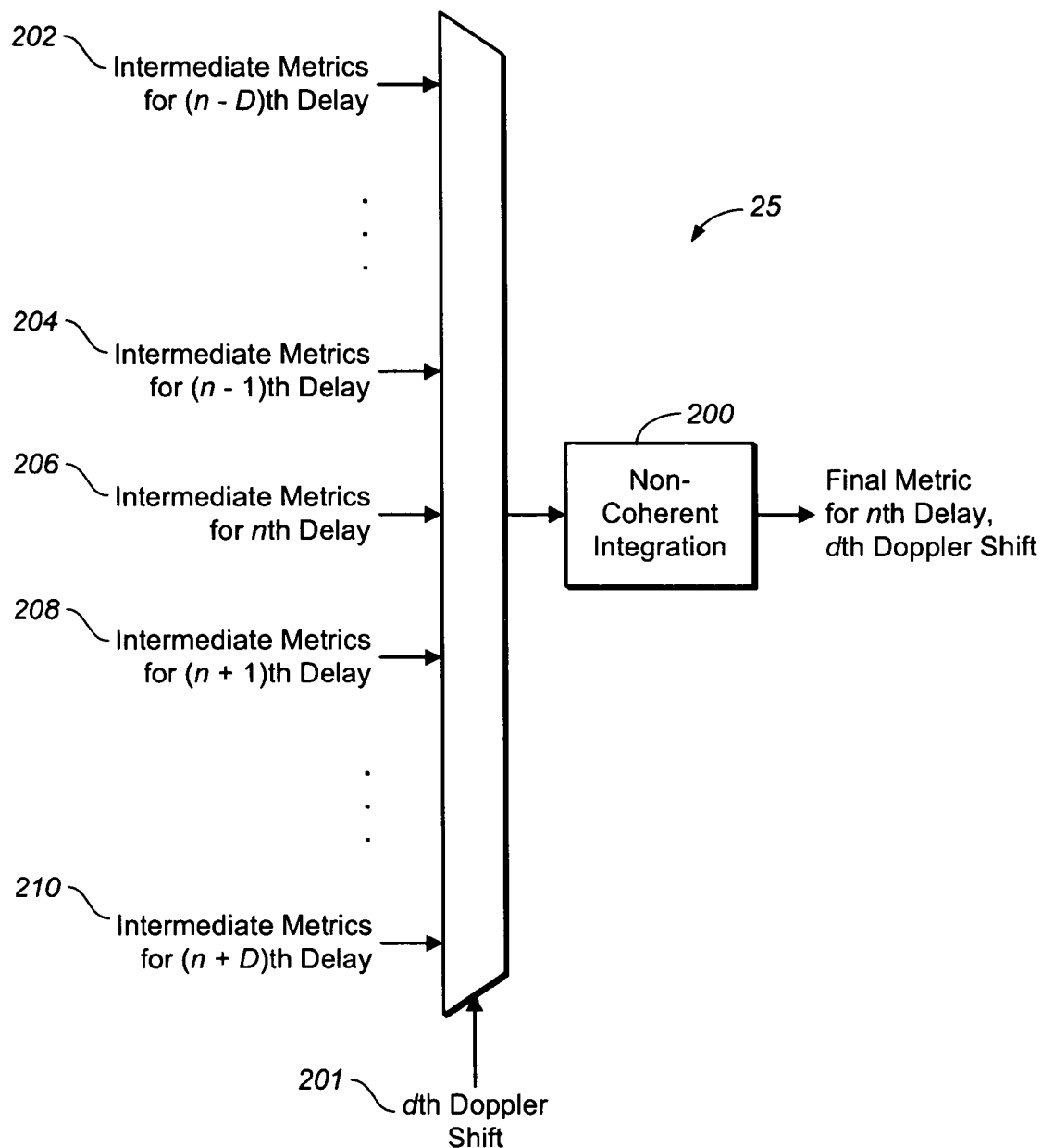
FIG. 2 is a block diagram of the final integration step of the efficient Doppler search of the present invention.

Turning attention to the functional operation of the present invention, as indicated in FIG. 2, there is shown further details of the Final Integration with Efficient Doppler Search block 25 shown in FIG. 1. FIG. 2 details the computation of one of the N(2D+1) final metrics. The final metric shown is for the nth delay (out of a total of N) and the dth Doppler shift (out of a total of 2D+1 for the nth delay). The Non-Coherent Integration block 200 sums consecutive intermediate metrics for subsets of the known sequence, some of which are illustrated graphically in FIG. 2 as Intermediate Metrics 202, 204, 206, 208, 210, to form a final metric for the entire known sequence. The dth Doppler shift, input 201 to the Doppler Search block 25, determines which intermediate metrics are summed together in the following way, by way of illustration and not of limitation.

For a zero Doppler shift, only the intermediate metrics from the nth delay are summed together, e.g., Intermediate Metrics 206, a zero Doppler shift would result in no time shift. For the maximum positive Doppler shift, the first intermediate metric is selected from the nth delay, Intermediate Metrics 206, the second intermediate metric is selected from the (n−1)th delay, 204, the third intermediate metric is selected from the (n−2)th delay (not shown), and so on to the (n−D)th delay, 202. For the maximum negative Doppler shift, the first intermediate metric is selected from the nth delay, 202, the second intermediate metric is selected from the (n+1)th delay, 208, the third intermediate metric is selected from the (n+2)th delay (not shown), and so on to the (n+D)th delay, 210.

Similarly, metrics for other Doppler shifts can be computed, as is apparent to one of ordinary skill using the teachings of the present invention. In general, the intermediate metrics to be summed may be chosen using the following expression: round[nth, (n+d/D)th, (n+2d/D)th, (n+3d/D)th . . . (n+Dd/D)th], where n=delay out of N total delays, d=dth Doppler shift (out of a total of 2D+1 for the nth delay, where d goes from −D to D). The "round" function rounds each operand to the nearest integer value. For example, for the $10^{th}$ delay and $-3^{rd}$ Doppler shift where D=4, intermediate metrics to be summed would be chosen as follows: round[10th, (10+−¾)th, (10+2(−3)/4)th, (10+3(−3)/4)th, (10+4(−3)/4)th]=[10th, 9th, 9th, 8th, 7th].

In this manner, the error in chip rate caused by Doppler shift is accounted for by progressively selecting intermediate metrics from different delays.

Using this Efficient Doppler Search technique outlined above, the final metrics for (2D+1) Doppler shifts for each of N delays can be computed (at relatively low speed) using intermediate metrics (computed at high speed) from only N+2D delays.

A receiver employing the apparatus and method of the present invention may detect signals with very low signal-to-noise ratio (SNR), often well below negative 20 dB, while tolerating Doppler shifts resulting in multiple chip times of timing shift over the length of the known sequence Although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

We claim:

1. A system for computationally efficient signal acquisition of spread-spectrum signals affected by Doppler shift comprising:

a first block receiving as input a received signal comprising spread spectrum chips, and receiving as input a known sequence, said first block correlating the known sequence with the received signal and producing intermediate metrics as output;

a second block receiving the intermediate metrics as input and integrating said intermediate metrics to final metrics for said known sequence as output; and, a third block receiving the final metrics as input to produce a decision for acquiring the received signal;

wherein said spread spectrum chips are subject to Doppler frequency shift, said first block comprises a Chip-Rate-Coherent Correlation block that performs chip-rate-coherent correlation of the received signal and the known sequence to produce the intermediate metrics;

said second block comprises a Final Integration With Efficient Doppler Search block that performs non-coherent integration of the intermediate metrics to produce the final metrics;

said chip-rate-coherent correlation block performs correlation of the received signal and the known sequence over subsets of said known sequence and outputs results as the intermediate metrics;

said chip-rate-coherent correlation block performs correlation of the received signal and the known sequence over a range of possible arrival times for the received signal, said chip-rate-coherent correlation block performs correlation of the received signal and the known sequence comprising N+2D values of delay, where N corresponds to a number of delays needed to search the possible range of arrival time of the received signal; D corresponds to additional delays before and after the N delays, with D having a maximum number comprising up to the maximum number of delays of time error that occur over the known sequence as a result of Doppler frequency shift.

2. The invention of claim 1, wherein:
said chip-rate-coherent correlation block performs calculations at a processing speed faster than a processing speed of said Final Integration With Efficient Doppler Search block.

3. The invention of claim 1 wherein:
the range of possible times is determined from a given start time according to a possible propagation time of the received signal as limited by the time it takes for the speed of light to be received by the first block from a receiver transmitting the received signal.

4. The invention of claim 3, wherein:
the range of possible times is determined from a given start time according to the possible range of time error between the transmitter transmitting the received signal and the first block receiving said received signal.

5. The invention of claim 1, wherein:
the Final Integration With Efficient Doppler Search block performs non-coherent integration over the intermediate metrics output by the chip-rate-coherent correlation block to obtain final metrics for the entire known sequence, by summing consecutive intermediate metrics over the subsets of the known sequence.

6. The invention of claim 5, wherein:
the Final Integration With Efficient Doppler Search block receives an input, the "dth Doppler Shift" input, which determines which of the intermediate metrics are to be summed, and,
the intermediate metrics to be summed may be chosen using the following expression: round[nth, (n+d/D)th, (n+2d/D)th, (n+3d/D)th . . . (n+Dd/D)th], where n=delay out of N total delays, d=dth Doppler shift (out of a total of 2D+1 for the nth delay, where d goes from –D to D) and the "round" function rounds each operand to the nearest integer value.

7. The invention of claim 5, wherein:
said chip-rate-coherent correlation block performs correlation of the received signal and the known sequence comprising N+2D values of delay, where N corresponds to the number of delays needed to search the possible range of arrival time of the received signal; and D corresponds to additional delays before and after the N delays, with D having a maximum number comprising up to the maximum number of delays of time error that can occur over the known sequence as a result of Doppler frequency shift; and,
said Final Integration With Efficient Doppler Search block computes intermediate metrics 2D+1 Doppler shifts for each of N delays, at a lower computational speed than the chip-rate-coherent correlation block computation of intermediate metrics at N+2D values of delay.

8. The invention according to claim 1, wherein:
the third block receiving the final metrics comprises a Decision block, and compares the final metrics to an input threshold signal to determine whether the received signal is a successful acquisition of a desired signal, the Decision block outputs a Acquisition Decision signal comprises the decision for acquiring the received signal, a Chip Timing signal comprising an estimate of the arrival time of the received signal, and a Chip Rate Doppler Shift signal comprising an estimate of the Doppler shift experienced by the detected signal.

9. A method for efficient Doppler search in signal acquisition comprising the steps of: receiving as input, to a Chip-Rate-Coherent Correlation block, a received signal comprising spread spectrum chips;
receiving as input to the Chip-Rate-Coherent Correlation block a known sequence;
correlating the received signal and the known sequence to produce intermediate metrics with the Chip-Rate-Coherent Correlation block;
inputting the intermediate metrics to a Final Integration With Efficient Doppler Search block;
integrating the intermediate metrics in the Final Integration block to produce final metrics;
outputting the final metrics to a Decision block which decides whether the received signal is a successful acquisition of a desired signal;
performing chip-rate-coherent correlation with the Chip-Rate-Coherent Correlation block to produce the intermediate metrics, and performs non-coherent integration of the intermediate metrics to produce the final metrics with the Final Integration With Efficient Doppler Search block;
performing said correlation of the received signal and the known sequence by the chip-rate-coherent correlation block over a range of possible arrival times for the received signal, the range of possible arrival times determined by the possible propagation time of the received signal as limited by fixed speed of light, and the possible range of time error between the transmitter of the signal and the reception at the Chip-Rate-Coherent Correlation block;
performing non-coherent integration over the intermediate metrics output by the chip-rate-coherent correlation block to obtain final metrics for the entire known sequence by summing consecutive intermediate metrics over the subsets of the known sequence.

10. The method according to claim 9, further comprising the steps of:
performing correlation of the received signal and the known sequence with N+2D value of delay, where N corresponds to the number of delays needed to search the possible range of arrival time of the received signal; and D corresponds to additional delays before and after the N delays, with D having a maximum number comprising up to the maximum number of delays of time error that can occur over the known sequence as a result of Doppler frequency shift.

11. A signal acquisition circuit with a computationally efficient Doppler search for signal acquisition comprising:
means for chip-rate-coherent correlation receiving as input a received signal comprising spread spectrum chips, and receiving as input a known sequence, said means for chip-rate-coherent correlation correlating the known sequence with the received signal and producing intermediate metrics as output;
means for non-coherent integration receiving the intermediate metrics as input and integrating said intermediate metrics to final metrics for said known sequence as output;
said means for chip-rate-coherent correlation performs calculations at a processing speed faster than the processing speed of said means for non-coherent integration;

said means for chip-rate-coherent correlation performs correlation of the received signal and the known sequence over subsets of said known sequence and outputs the results as the intermediate metrics;

said means for chip-rate-coherent correlation block performs correlation of the received signal and the known sequence over a range of possible arrival times for the received signal, wherein, the range of possible times is determined from a given start time according to possible propagation time of the received signal as limited by the time it takes for speed of light to be received by means for chip-rate-coherent correlation from a receiver transmitting the received signal, and, the range of possible times is determined from a given start time according to the possible range of time error between the transmitter transmitting the received signal and the means for chip-rate-coherent correlation receiving said received signal; and, the means for non-coherent integration performs non-coherent integration over the intermediate metrics output by the chip-rate-coherent correlation block to obtain final metrics for the entire known sequence, by summing consecutive intermediate metrics over the subsets of the known sequence.

12. The signal acquisition circuit of claim 11, further comprising:

means for deciding whether a received signal is a successful acquisition of a desired signal, said means for deciding compares the final metrics received from said means for non-coherent integration, comparing said final metrics to an input threshold signal to determine whether the received signal is a successful, said means for deciding outputs a Acquisition Decision signal comprising the decision for acquiring the received signal, a Chip Timing signal comprising an estimate of the arrival time of the received signal, and a Chip Rate Doppler Shift signal comprising an estimate of the Doppler shift experienced by the detected signal.

* * * * *